US007001051B2

(12) United States Patent  
Palmer et al.

(10) Patent No.: US 7,001,051 B2
(45) Date of Patent: Feb. 21, 2006

(54) HUMAN POWERED VEHICLE SAFETY LIGHTING STRUCTURES

(75) Inventors: Jesse N. Palmer, Greenville, NC (US); Barry L. Allen, Greenville, NC (US)

(73) Assignee: Heli, LLC, Greenville, NC (US)

( * ) Notice: Subject to any disclaimer, the term of this patent is extended or adjusted under 35 U.S.C. 154(b) by 0 days.

(21) Appl. No.: 10/812,372

(22) Filed: Mar. 29, 2004

(65) Prior Publication Data

US 2004/0196647 A1 Oct. 7, 2004

Related U.S. Application Data

(60) Provisional application No. 60/459,395, filed on Apr. 1, 2003.

(51) Int. Cl.
*F21V 33/00* (2006.01)

(52) U.S. Cl. .................. 362/473; 362/500; 362/84; 362/42

(58) Field of Classification Search ................ 362/473, 362/500, 84, 396, 42, 806, 217; D12/500; 313/502, 505, 511; 152/523–525; 250/461.1; 40/543
See application file for complete search history.

(56) References Cited

U.S. PATENT DOCUMENTS

| 3,253,634 | A | * | 5/1966 | De Young ................ 152/523 |
| 3,452,799 | A | * | 7/1969 | Phillips et al. ............ 152/523 |
| 3,729,041 | A | | 4/1973 | Kubota |
| 3,946,782 | A | | 3/1976 | Petrasek et al. |
| 3,997,184 | A | | 12/1976 | Riti |
| 4,088,882 | A | | 5/1978 | Lewis |
| 4,418,962 | A | | 12/1983 | Schaffer |
| 4,847,735 | A | | 7/1989 | Kawasaki |
| 5,053,930 | A | | 10/1991 | Benavides |
| 5,058,648 | A | | 10/1991 | Kansupada |
| 5,105,308 | A | | 4/1992 | Holley et al. |
| 5,278,732 | A | | 1/1994 | Frankum |
| 5,330,195 | A | | 7/1994 | Gulick |
| 5,374,377 | A | | 12/1994 | Nguyen et al. |
| 5,477,427 | A | | 12/1995 | Forman |
| 5,523,925 | A | * | 6/1996 | Bare, IV ................. 362/473 |
| 5,588,736 | A | | 12/1996 | Shea, Sr. |
| 5,624,175 | A | | 4/1997 | Gelormino et al. |
| 5,645,663 | A | | 7/1997 | Nakayama et al. |
| 5,665,793 | A | | 9/1997 | Anders |
| 5,714,255 | A | | 2/1998 | Yeh |
| 5,759,671 | A | | 6/1998 | Tanaka et al. |
| 5,823,653 | A | | 10/1998 | Elam, Jr. et al. |
| 5,869,930 | A | * | 2/1999 | Baumberg et al. ........... 313/506 |
| 5,871,269 | A | | 2/1999 | Chien |
| 5,876,108 | A | | 3/1999 | Chien |
| 5,914,197 | A | | 6/1999 | Goudjil |

(Continued)

FOREIGN PATENT DOCUMENTS

GB 2265586 10/1993

(Continued)

*Primary Examiner*—Stephen Husar
*Assistant Examiner*—Hargobind S. Sawhney
(74) *Attorney, Agent, or Firm*—Coats & Bennett, P.L.L.C.

(57) ABSTRACT

A plurality of lighting structures is provided for enhancing the visibility of a human powered vehicle at night. The visibility enhanced human powered vehicle has a frame with attached wheels having tires including sidewalls. The safety lighting structures include at least one photo-luminescent section and at least one reflective section being located on at least one of the wheels. A light source is attachable to the human powered vehicle to direct light against the photo-luminescent sections.

12 Claims, 4 Drawing Sheets

U.S. PATENT DOCUMENTS

| | | | |
|---|---|---|---|
| 5,925,287 | A | 7/1999 | Mathiasson et al. |
| 5,976,411 | A | 11/1999 | Feng et al. |
| 5,984,487 | A | 11/1999 | McGhee |
| 6,005,024 | A | 12/1999 | Anders et al. |
| 6,059,377 | A | 5/2000 | Wu |
| 6,070,997 | A | 6/2000 | Duke et al. |
| 6,186,635 | B1 | 2/2001 | Peterson et al. |
| 6,207,077 | B1 | 3/2001 | Burnell-Jones |
| 6,286,573 | B1 | 9/2001 | Hine |
| 6,322,237 | B1 | 11/2001 | Lee |
| 6,375,864 | B1 | 4/2002 | Phillips et al. |
| 6,431,236 | B1 | 8/2002 | Kanenari et al. |
| D486,124 | S * | 2/2004 | LeFranc ............... D12/605 |
| 6,779,913 | B1 * | 8/2004 | Niezrecki et al. ........... 362/473 |
| 6,807,995 | B1 * | 10/2004 | Majumdar et al. .......... 152/523 |
| 6,832,847 | B1 * | 12/2004 | Frosythe et al. ............ 362/473 |
| 2001/0050124 | A1 | 12/2001 | Smith |
| 2003/0140999 | A1 | 7/2003 | Smith et al. |

FOREIGN PATENT DOCUMENTS

GB            2265586 A   * 10/1993

* cited by examiner

HUMAN POWERED VEHICLE SAFETY LIGHTING STRUCTURES

This application claims the benefit of the filing date of U.S. Provisional Application Ser. No. 60/459,395, filed on Apr. 1, 2003, the disclosure of which is incorporated herein by reference.

FIELD OF THE INVENTION

The present invention relates to human powered vehicle safety, and in particular to lighting structures for providing enhanced visibility of a human powered vehicle at night. The lighting structures may be arranged on a human powered vehicle for a decorative effect.

DESCRIPTION OF THE PRIOR ART

Human powered vehicles, such as bicycles, scooters and wheelchairs, are generally comprised of a frame for supporting wheels and a rider, and are generally powered by movements of the rider's arms or legs. As a result of being human powered, such vehicles have been unable to match the nighttime visibility of motor vehicles having powerfully lit safety lighting structures such as high intensity head lamps and taillights. Instead, the prior art has generally limited safety lighting structures for human powered vehicles to minimal area reflectors and low wattage flashlight type head lamps. Due to the small amount of reflective area at various approach angles, coupled with low light intensity lamps, the prior art lighting structures offer only a modicum of visibility in situations in which their luminosity is overwhelmed by high intensity motor vehicle head lamps. Thus, there remains a need for human powered lighting structures that are highly visible, offering a large safety factor in situations of darkness combined with overwhelming oncoming motor vehicle head lamps.

SUMMARY OF THE INVENTION

The present invention addresses these needs by providing unique lighting structures for human powered vehicles such as bicycles, scooters and wheelchairs. The unique lighting structures greatly increase the luminous areas that are visible to others that approach or are in the path of a human powered vehicle equipped with the lighting structures of the present invention.

Generally, the preferred lighting structures of the present invention are comprised of areas or sections formed of photo-luminescent and reflective materials. In the preferred embodiment, the photo-luminescent sections of the lighting structures are placed on the sides of a human powered vehicle's wheels. A light source is mounted on the frame of the human powered vehicle to direct light against the photo-luminescent sections as the wheels rotate. Light shining on the photo-luminescent sections causes the photo-luminescent material making up the sections to glow for a short period of time. As a result, a continuous illumination is provided around the wheel as the wheel rotates.

Since the shining of an intense light, e.g., automobile headlights, onto the human powered vehicle may prevent the photo-luminescent glow from being seen, the reflective sections are spaced around the wheel to form a relatively large and highly noticeable light reflective pattern. The combination of the photo-luminescent sections and the reflective sections aids in warning others of the presence of the human powered vehicle, whether or not an external light is being shined on the human powered vehicle.

Bicycles and wheelchairs are examples of human powered vehicles that typically have wheels made up of rims, spokes and tires. In the preferred embodiment, a tire belonging to a wheel such as a bicycle wheel is partially or fully covered with a photo-luminescent material. The covering material can be, but is not limited to, photo-luminescent stickers, paints, injection molded rubber, plastics and resins. A good candidate for the photo-luminescent material is a phosphorescent compound consisting of Zinc Sulfide mixed in with an epoxy binder, but may also consist of other glowing pigments suspended in epoxy, rubber or plastic surfaces. Furthermore, to prevent the photo-luminescent material from wearing off over time, the material can be molded or vulcanized into a bicycle's tires. Moreover, the photo-luminescent material is not limited to the tires. The spokes, wheel covers and frame can also include photo-luminescent sections.

Reflective materials are provided to supplement the glow of the photo-luminescent materials in instances where bright lighting conditions may drown out its effectiveness, e.g., in the direct path of very bright car headlights. In the preferred embodiment, the reflective material comprises reflective particles that are molded or vulcanized into the rubber of the tires of the human powered vehicle. Moreover, a plurality of reflective stickers can be added to the tires, wheels or frame of the human powered vehicle to increase its overall visibility. Each of the plurality of reflective stickers has a strong adhesive backing that adheres readily to rubber and metal and is weather resistant as well as waterproof.

Natural or man-made light sources may be used to charge photo-luminescent materials. However, due to the short glow life of these materials, it is preferred that a man-made light source is attached to the bicycle to constantly recharge the photo-luminescent material while the bicycle is in motion. The light source can be incandescent or fluorescent. An array of Light Emitting Diodes (LEADS) is the preferred light source. Also, it is preferred that the emitted light spectrum includes as much of the UV light band as feasible.

The light source is attached to a human powered vehicle such that a beam of light is directed onto the photo-luminescent materials. Particularly good locations on a bicycle for the light source are the forks or frame of the bicycle. Another position for these lights may be in the fender or on the sides of the bicycle's braking system. For human powered vehicles in general, the light source may be mounted by using a strap and bracket system that is built into an LED housing, or it may be bolted, glued, integrated into the vehicle's frame, or otherwise be affixed to the vehicle in any other manner. The light source is powered either by chemical batteries or by an electrical generator driven by the motion of the human powered vehicle.

In another embodiment of the invention, an electroluminescent wire can be positioned within the interior of a transparent tire or within a transparent section of a human powered vehicle's frame. Alternately, the electroluminescent wire within a transparent tube could be attached to the outside of the tire, rim or frame of the human powered vehicle.

In yet another embodiment, a photo-luminescent coating can be applied to the inside surface of a clear rubber tire. The tire can be filled with a low-grade radioactive gas such as tritium gas. The tritium gas will react with the photo-luminescent coating to produce a strong phosphorescent glow for several years. Reflective sections can be added to the outside of the tire to provide reflection of light coming from external resources. These and other aspects of the present invention will become apparent to those skilled in the art after a reading of the following detailed description of the invention.

DETAILED DESCRIPTION OF THE INVENTION

In the following description, terms such as horizontal, upright, vertical, above, below, beneath and the like, are used solely for the purpose of clarity in illustrating the invention, and should not be taken as words of limitation. The drawings are for the purpose of illustrating the invention and are not intended to be to scale.

Figure 1:
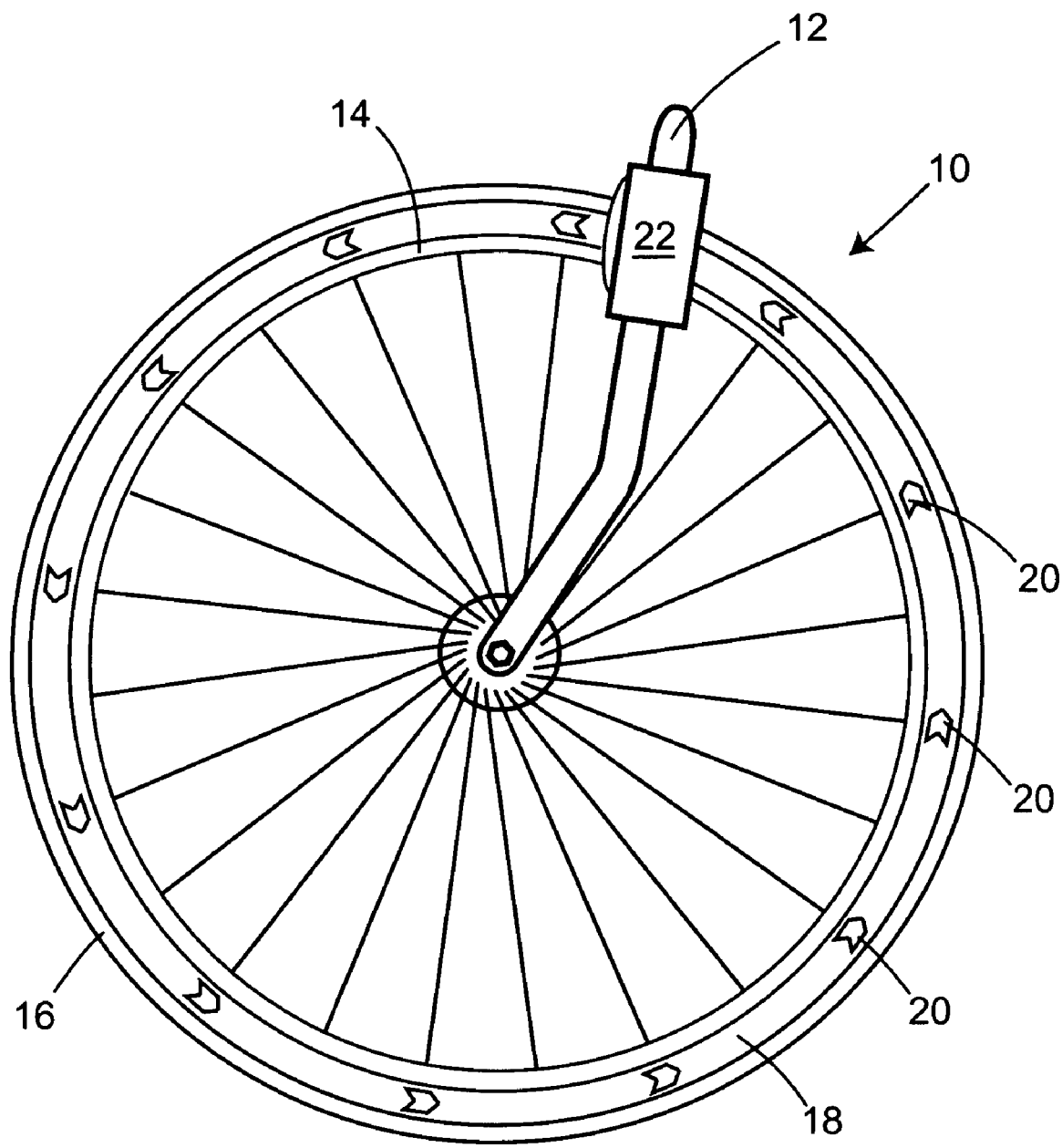
FIG. 1 is a side view of a bicycle wheel having lighting structures made up of intermittent phosphorescent sections and reflective sections.

FIG. 1 depicts a bicycle wheel, generally 10 attached to a fork 12. Bicycle wheel 10 consists of a spoked rim 14 with an attached tire 16. A phosphorescent section 18 is located on at least one tire sidewall 19. Reflective stickers 20 are spaced around wheel 10 and are preferably set within phosphorescent section 18. A lamp 22, attached to fork 12 directs artificial light onto phosphorescent section 18. The light from lamp 22 sets phosphorescent section 18 aglow as wheel 10 rotates. Section 18 will appear as a bright glowing ring providing wheel 10 rotates fast enough. Nevertheless, the glow may not be bright enough to overcome the glare of bright car headlights. Therefore, reflective stickers 20 are provided to make wheel 10 visible in glaring light conditions.

Figure 2:
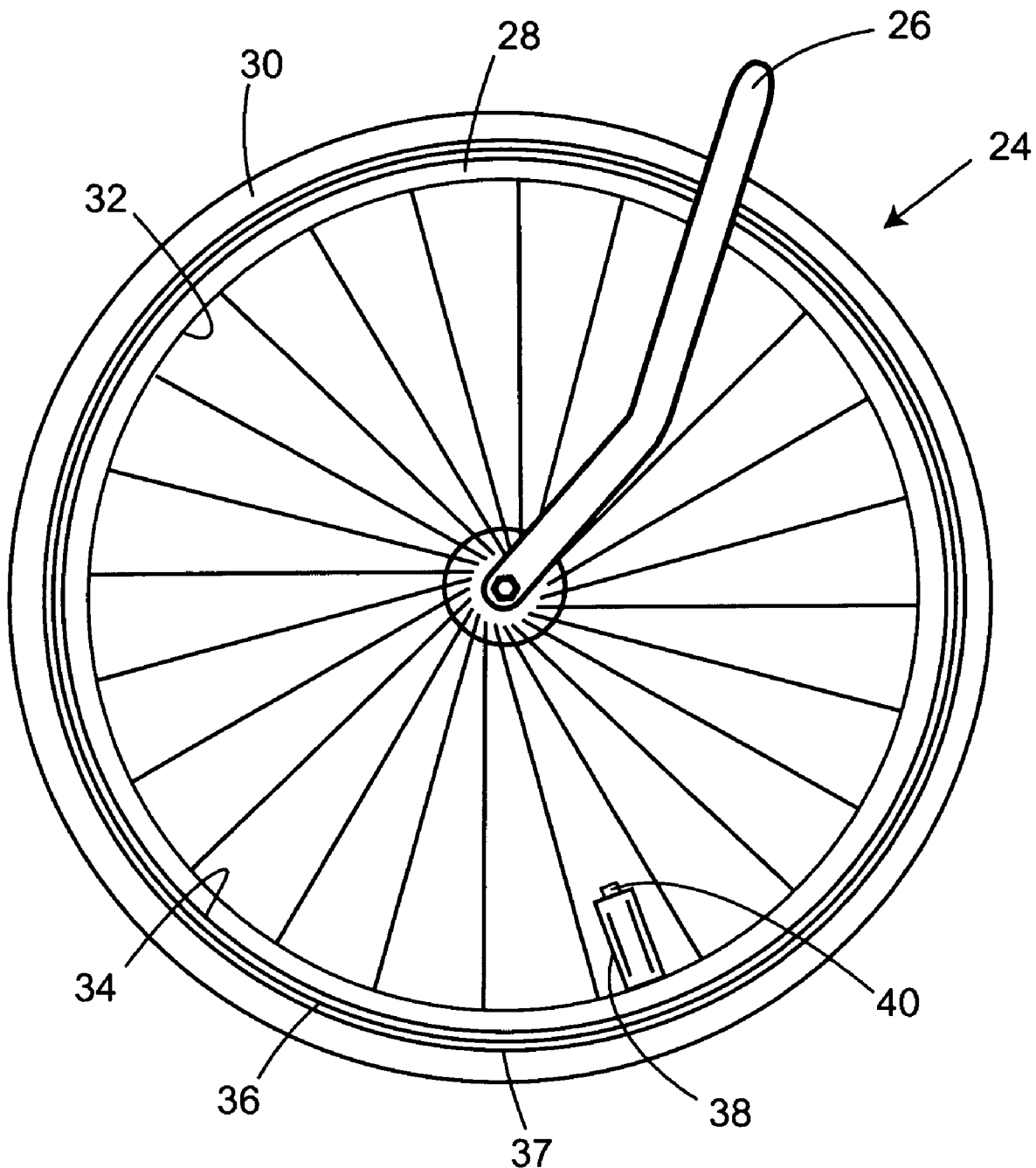
FIG. 2 is a side view of a bicycle wheel that includes an electroluminescent wire.

FIG. 2 depicts a bicycle wheel, generally 24 attached to a fork 26. Bicycle wheel 24 consists of a spoked rim 28 and an attached tire 30. Rim 28 has an inner wall 32 and an upper edge 34. An electroluminescent wire 36 is attached around rim upper edge 34. Electroluminescent wire 36 is a type of light emitting wire consisting of a first conductor coated in an electro-reactive substance that is wrapped along its length by a second smaller conductor. A clear plastic tube 37 protects electroluminescent wire 36 from the elements. U.S. Pat. No. 5,869,930 discloses an example of an electroluminescent wire suitable for use with the present invention. An electrical power source 38 energizes electroluminescent wire 36. Preferably, power source 38 sources electrical power from batteries (not shown) and an AC inverter circuit (not shown). FIG. 2 also shows power source 38 attached to rim inner wall 32. A switch 40 is provided to control the flow of electrical current to electroluminescent wire 36.

Figure 3:
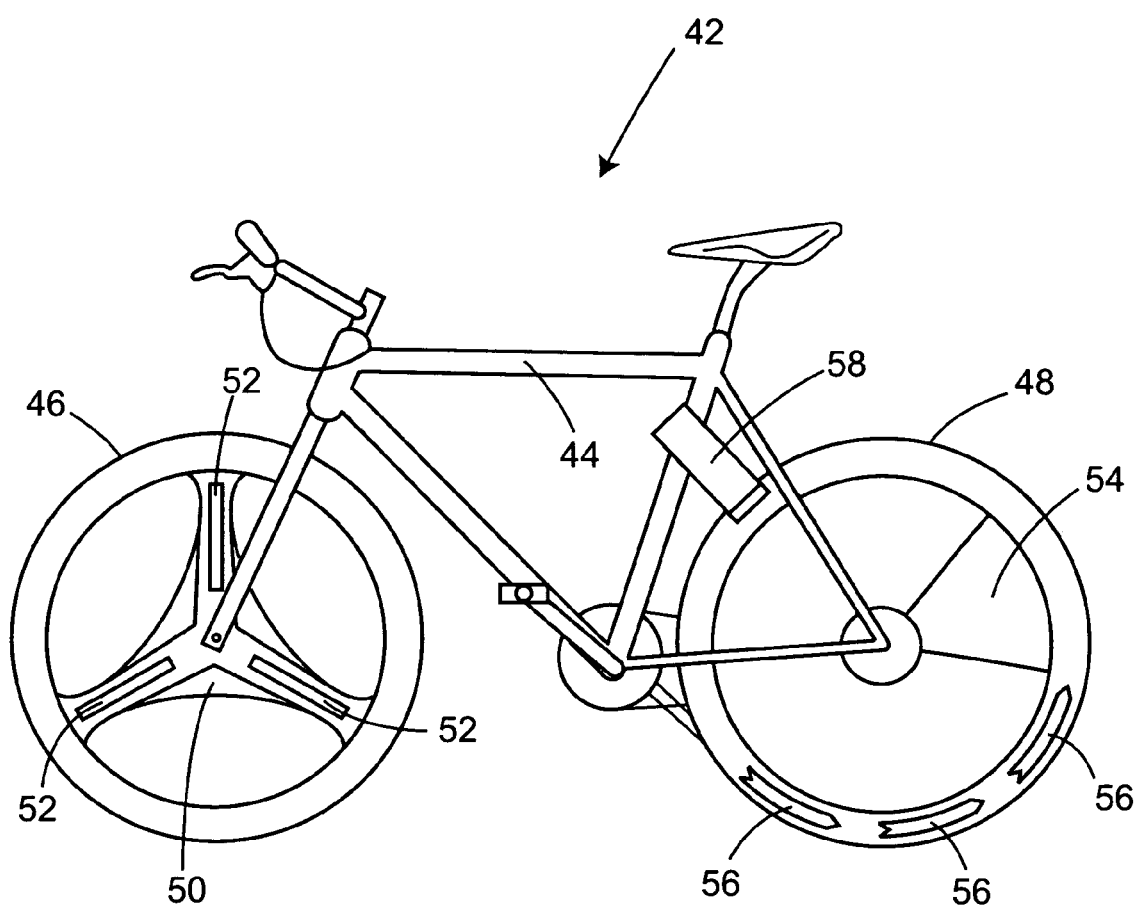
FIG. 3 is a side view of a bicycle having a front wheel with electroluminescent wires built into a mag style rim and a rear wheel having reflective stickers and a phosphorescent spoke cover.

FIG. 3 shows a bicycle, generally 42 consisting of a frame 44 including an attached front wheel 46 and an attached rear wheel 48. Front wheel 46 has a MAG type rim 50, instead of an ordinary spoked rim. Rim 50 includes a phosphorescent spoke cover 54. Reflective stickers 56 are adhered to rear wheel 48. A light source 58 is attached to frame 44 and is positioned so that light is directed onto phosphorescent spoke cover 54.

Figure 4:
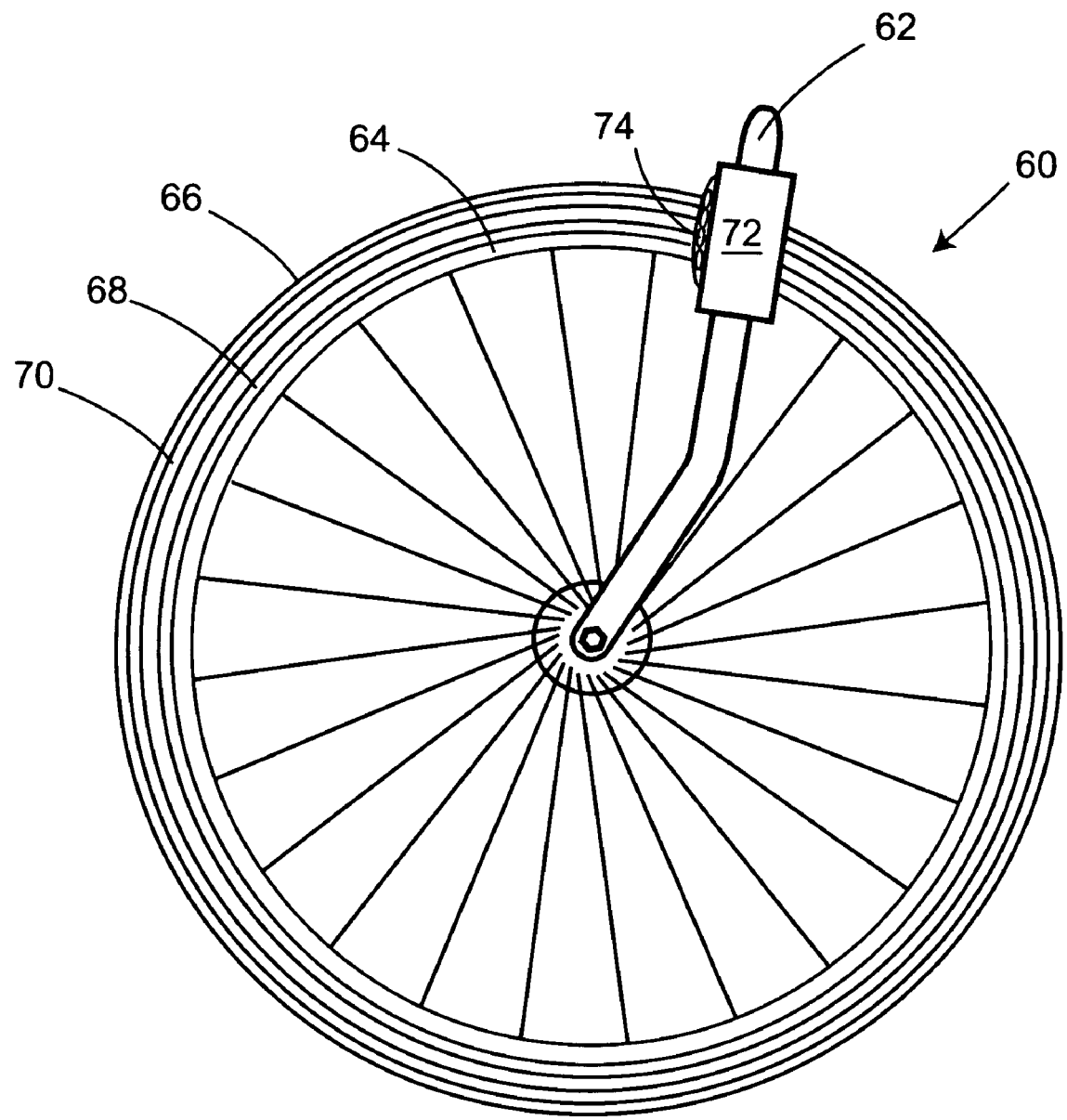
FIG. 4 is a side view of a bicycle wheel having lighting structures made up of photo-luminescent and reflective materials molded into the wheel's tire.

FIG. 4 depicts a bicycle wheel, generally 60 attached to a fork 62. Bicycle wheel 60 consists of a spoked rim 64 with an attached tire 66. A reflective section 68 and a phosphorescent section 70 are included on at least one sidewall of tire 66. A light source housing 72 directs the light from an array of light emitting diodes 74 onto phosphorescent section 70.

What is claimed is:

1. A lighting structure for a human powered vehicle comprising a wheel having a translucent tire with an inside coated with a photo-luminescent material, said tire being inflated with a low-grade radioactive gas that reacts with said photo-luminescent material to cause it to glow.

2. A safety lighting structure for a human powered vehicle having a frame and at least one attached wheel, the wheel having a tire including sidewalls, comprising:
   at least one photo-luminescent section located on said wheel;
   at least one reflective section located on said tire proximate to, and generally visually concentric with respect to, said photo-luminescent section when the wheel is viewed from the side;
   a light emitting diode light source connected to said human powered vehicle frame to direct UV light against said photo-luminescent section as said at least one wheel rotates.

3. The safety lighting structure of claim 2 wherein said at least one photo-luminescent section and said at least one reflective section are located on the tire sidewall.

4. The safety lighting structure of claim 2 wherein said photo-luminescent section comprises a phosphorescent compound comprising zinc sulfide mixed with an epoxy binder.

5. The safety lighting structure of claim 2 wherein said photo-luminescent section comprises a photo-luminescent material molded into said tire.

6. The safety lighting structure of claim 2 wherein said at least one reflective section comprises a reflective sticker.

7. The safety lighting structure of claim 2 wherein said photo-luminescent section and said reflective section form visually concentric rings in side view when said tire rotates.

8. A safety lighting structure for a human powered vehicle having a frame and at least one attached wheel, the wheel having a tire including sidewalls, comprising:
   a plurality of photo-luminescent sections located on the wheel;
   a plurality of reflective sections located on said tire and disposed between adjacent photo-luminescent sections;
   a light emitting diode light source connected to said human powered vehicle frame to direct UV light against said photo-luminescent sections as said at least one wheel rotates.

9. The safety lighting structure of claim 8 wherein said photo-luminescent sections and said reflective sections are located on the tire sidewall.

10. The safety lighting structure of claim 8 wherein said photo-luminescent section comprises a phosphorescent compound comprising zinc sulfide mixed with an epoxy binder.

11. The safety lighting structure of claim 8 wherein said photo-luminescent section comprises a photo-luminescent material molded into said tire.

12. The safety lighting structure of claim 8 wherein said reflective sections comprises reflective stickers.

* * * * *